United States Patent
Teng et al.

(10) Patent No.: US 9,476,771 B2
(45) Date of Patent: *Oct. 25, 2016

(54) CONTROL METHOD FOR CLEANING ROBOTS

(71) Applicant: Micro-Star International Company Limited, New Taipei (TW)

(72) Inventors: You-Wei Teng, New Taipei (TW); Yi-Chih Yeh, New Taipei (TW); Shih-Che Hung, Hsinchu (TW)

(73) Assignee: MSI COMPUTER (SHENZHEN) CO., LTD., Shenzhen (CN)

( * ) Notice: Subject to any disclaimer, the term of this patent is extended or adjusted under 35 U.S.C. 154(b) by 543 days.

This patent is subject to a terminal disclaimer.

(21) Appl. No.: 13/767,990

(22) Filed: Feb. 15, 2013

(65) Prior Publication Data

US 2013/0214726 A1 Aug. 22, 2013

Related U.S. Application Data

(60) Provisional application No. 61/599,690, filed on Feb. 16, 2012.

(30) Foreign Application Priority Data

Sep. 19, 2012 (TW) .............................. 101134222 A

(51) Int. Cl.
*H02J 7/00* (2006.01)
*G01J 5/02* (2006.01)
*G05D 1/02* (2006.01)

(52) U.S. Cl.
CPC .............. *G01J 5/028* (2013.01); *G05D 1/0225* (2013.01); *G05D 1/0234* (2013.01); *H02J 7/0042* (2013.01); *A47L 2201/02* (2013.01); *A47L 2201/04* (2013.01); *G05D 1/0255* (2013.01); *G05D 2201/0215* (2013.01)

(58) Field of Classification Search
CPC ............ A47L 2201/02; A47L 2201/04; G01J 5/028; G05D 1/0225; G05D 1/0234; G05D 1/0255; G05D 2201/0215
See application file for complete search history.

(56) References Cited

U.S. PATENT DOCUMENTS

2007/0050086 A1* 3/2007 Lim .................... G05D 1/0225 700/245
2010/0324736 A1* 12/2010 Yoo .................... G05D 1/0225 700/259

FOREIGN PATENT DOCUMENTS

CN 1923469 A 3/2007
CN 101972129 A 2/2011

* cited by examiner

*Primary Examiner* — Nha Nguyen
(74) *Attorney, Agent, or Firm* — Birch, Stewart, Kolasch & Birch, LLP

(57) ABSTRACT

An embodiment of the invention provides a cleaning robot including a light detector and a controller. The light detector detects a light beam. The controller is coupled to the light detector to control the cleaning robot. When the controller determines that the light beam is being output by a charging station, the controller controls the cleaning robot to move to the charging station along a first boundary of the light beam, which is substantially perpendicular to the charging station.

15 Claims, 10 Drawing Sheets

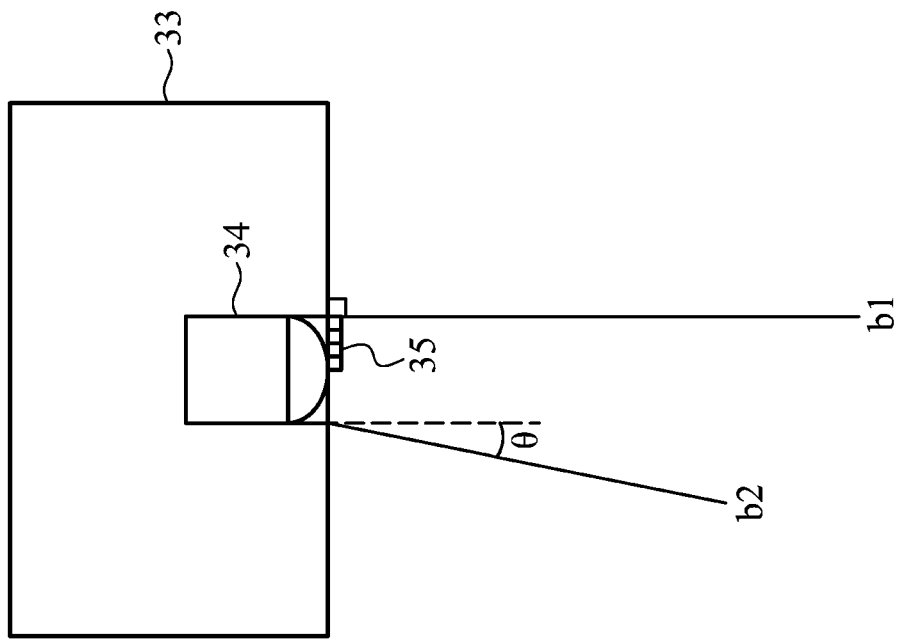
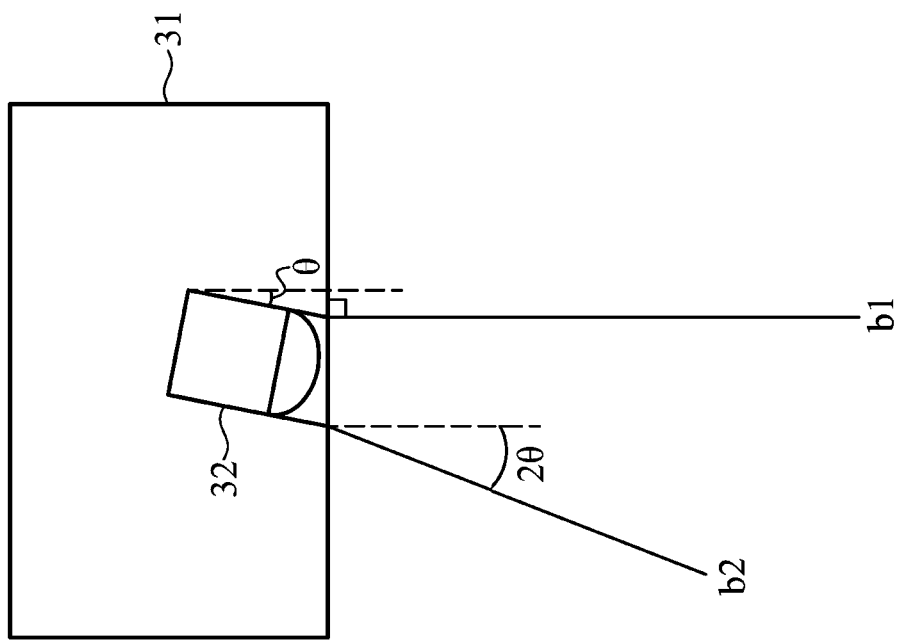
FIG. 3A
FIG. 3B

CONTROL METHOD FOR CLEANING ROBOTS

CROSS REFERENCE TO RELATED APPLICATIONS

This application claims the benefit of U.S. Provisional Application No. 61/599,690 filed Feb. 16, 2012, the entirety of which is incorporated by reference herein.

This application claims priority of Taiwan Patent Application No. 101134222, filed on Sep. 19, 2012, the entirety of which is incorporated by reference herein.

BACKGROUND OF THE INVENTION

1. Field of the Invention

The invention relates to a cleaning robot, and more particularly, to a cleaning robot with a non-omnidirectional light detector.

2. Description of the Related Art

A variety of movable robots, which generally include a driving means, a sensor and a travel controller, and perform many useful functions while autonomously operating, have been developed. For example, a cleaning robot for the home, is a cleaning device that sucks dust and dirt from the floor of a room while autonomously moving around the room without user manipulation.

BRIEF SUMMARY OF THE INVENTION

An embodiment of the invention provides a cleaning robot comprising a light detector and a controller. The light detector detects a light beam. The controller is coupled to the light detector to control the cleaning robot. When the controller determines that the light beam is being output by a charging station, the controller controls the cleaning robot to move to the charging station along a first boundary of the light beam, which is substantially perpendicular to the charging station.

Another embodiment of the invention provides a charging system comprising a charging station and a cleaning robot. The charging station emits a first light beam having a second boundary and a first boundary which is substantially perpendicular to the charging station. The cleaning robot comprises a light detector and a controller. The controller is coupled to the light detector to receive a detection result of the light detector. When the light detector detects the first light beam, the controller controls the cleaning robot to move to the charging station along the first boundary.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3A is a schematic diagram of an embodiment of an IR transmitter of a charging station according to the invention.

FIG. 3B is a schematic diagram of another embodiment of an IR transmitter of a charging station according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
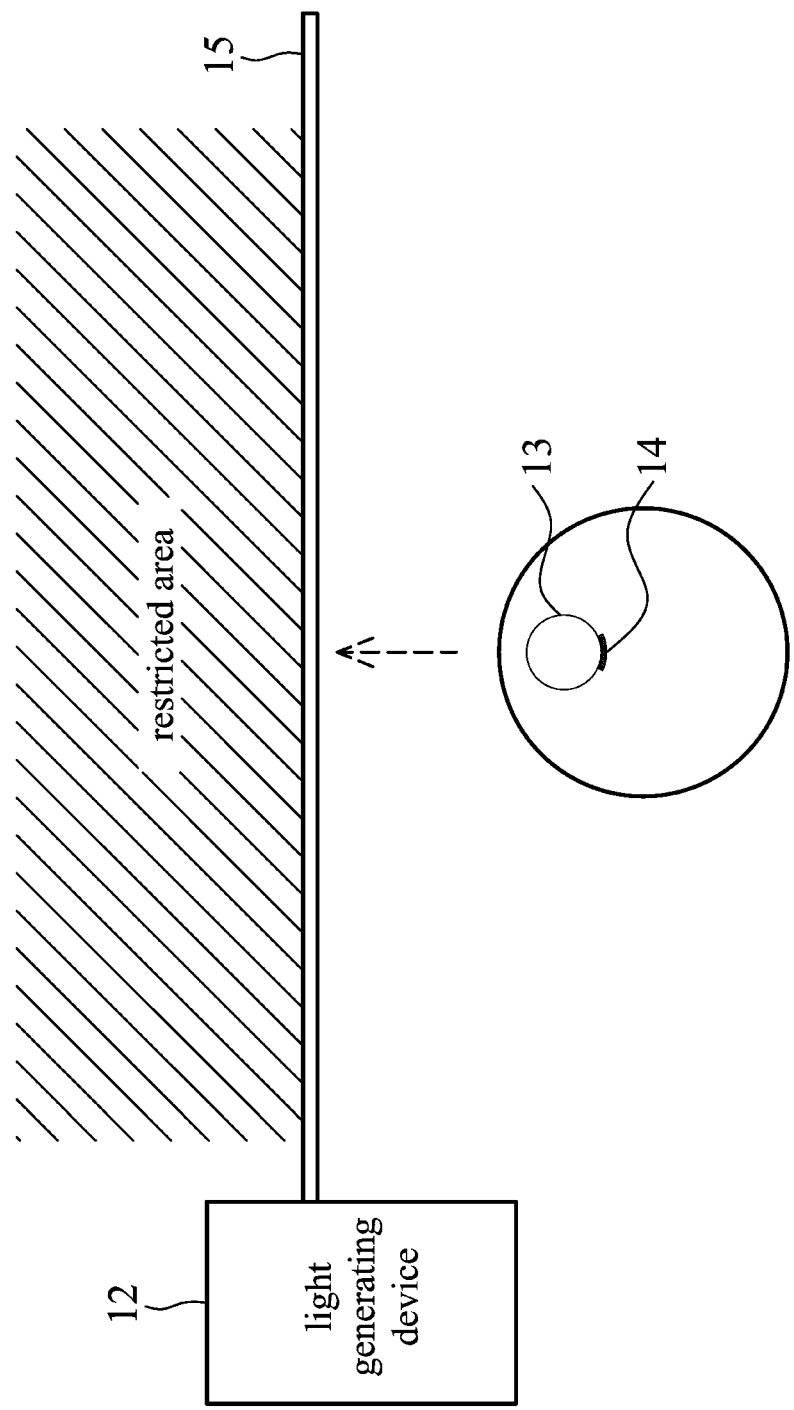
FIG. 1 is a schematic diagram of a light generating device and a cleaning robot according to an embodiment of the invention.

FIG. 1 is a schematic diagram of a light generating device and a cleaning robot according to an embodiment of the invention. The light generating device 12 outputs a light beam 15 to label a restricted area that the cleaning robot 11 cannot enter. The cleaning robot 11 comprises a non-omnidirectional light detector 13 having a rib (or called mask) 14, wherein the rib 14 produces a shadowed area on the non-omnidirectional light detector 13 by a predetermined angle and the range of the predetermined angle is from 30 degrees to 90 degrees.

The rib 14 may be fixed on the surface of the non-omnidirectional light detector 13 or movable along the non-omnidirectional light detector 13. The rib 14 can be spun in 360 degrees along the surface of the non-omnidirectional light detector 13. In this embodiment, the term, non-omni, is a functional description to describe that the rib 14 causes an area on the surface of the non-omnidirectional light detector 13 and the non-omnidirectional light detector 13 cannot not detect light therein or light to not directly reach that area.

Thus, the non-omnidirectional light detector 13 can be implemented in two ways. The first implementation is to combine an omni-light detector with a rib 14 and the rib 14 is fixed on a specific position of the surface of the omni-light detector. The non-omnidirectional light detector 13 is disposed on a plate that can be spun by a motor. Thus, the purpose of spinning of the non-omnidirectional light detector 13 can be achieved. When the non-omnidirectional light detector 13 detects the light beam, an incident angle of the light beam 15 can be determined by spinning the non-omnidirectional light detector 13.

Another implementation of the non-omnidirectional light detector 13 is implemented by telescoping a mask kit on an omni-light detector, wherein the omni light detector cannot be spun and the masking kit is movable along a predetermined track around the omni light detector. The mask kit is spun by a motor. When the non-omnidirectional light detector 13 detects the light beam 15, the mask kit is spun to determine the incident angle of the light beam 15.

Figure 2:
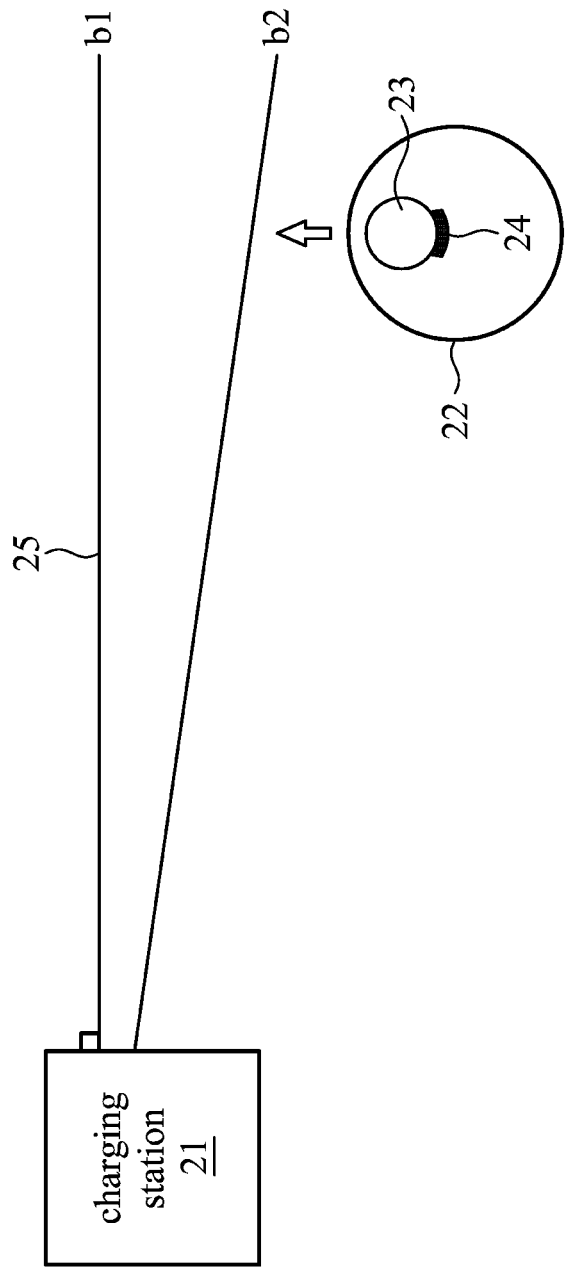
FIG. 2 is a schematic of a cleaning robot and a charging station according to an embodiment of the invention.

FIG. 2 is a schematic of a cleaning robot and a charging station according to an embodiment of the invention. The charging station 21 comprises an Infrared (IR) transmitter to output an IR light beam 25. The IR light beam 25 has a first encoding format or a first modulation format. The IR light beam 25 comprises a first boundary b1 and a second boundary b2, wherein the first boundary b1 is perpendicular or substantially perpendicular to the charging station 21. In one embodiment, the included angle between the first boundary b1 and the charging station 21 is less than 10 degrees. In this embodiment, the charging station 21 directs the cleaning robot 22 to move along the first boundary b1 to enter the charging station 21 for charging.

The IR light beam 25 is an encoded IR signal and IR light beam 25 carries information related to the charging station 21, such as the identification of the charging station 21. In one embodiment, the data carried by the IR light beam 25 comprises a first bit to indicate whether the first boundary b1 or the second boundary b2 is perpendicular or substantially perpendicular to the charging station 21. In other words, the first bit indicates that the cleaning robot 22 moves to the charging station 21 along the first boundary b1 or the second boundary b2.

Assuming the first boundary b1 of the IR light beam 25 is perpendicular to the charging station 21, the logic value of the first bit is 1, and assuming the second boundary b1 of the IR light beam 25 is perpendicular to the charging station 21, the logic value of the first bit is 0. In this embodiment, the first boundary b1 of the IR light beam 25 is perpendicular to the charging station 21 and the logic value of the first bit is 1.

When the cleaning robot 22 keeps moving forward, the non-omnidirectional light detector 23 detects the IR light beam 25. A controller of the cleaning robot 22 decodes the detected IR light beam 25 and determines that the logic value of the first bit is 1. Then, the non-omnidirectional light detector 23 is spun and the controller determines that the charging station 21 is located at the left side of the cleaning robot 23 by the help of the rib 24.

The controller of the cleaning robot 22 then determines that the cleaning robot 22 is currently moving from the second boundary b2 to the first boundary b1 according to the logic value of the first bit and the location of the charging station 21, and the cleaning robot 22 should move along the first boundary b1 to enter the charging station 21. When the non-omnidirectional light detector 23 does not detect the IR light beam 25, it means that the cleaning robot 22 has left the first boundary area. The cleaning robot 22 is then spun in the counter clockwise direction and when the non-omnidirectional light detector 23 detects the IR light beam 25, the cleaning robot is stopped from spinning.

When the non-omnidirectional light detector 23 detects the IR light beam 25, the rib 24 is disposed in front of the non-omnidirectional light detector 23 and the non-omnidirectional light detector 23 therefore cannot detect the IR light beam 25 from the charging station 21 because the IR light beam 25 is blocked by the rib 24. Thus, the cleaning robot 22 substantially moves straightforwardly to the charging station 21 along the first boundary b1 if the non-omnidirectional light detector 23 does not detect the IR light beam 25 during the movement of the cleaning robot 22.

When the non-omnidirectional light detector 23 detects the IR light beam 25 during the movement of the cleaning robot 22 to the charging station 21, the cleaning robot 22 stops and calibrates the moving direction of the cleaning robot 22 according to the detection result of the non-omnidirectional light detector 23.

When the cleaning robot 22 approaches to the charging station 21 and the distance between the cleaning robot 22 and the charging station 21 is less than a predetermined distance, a touch sensor outputs a stop signal to the controller of the cleaning robot 22. The touch sensor is disposed in the front end of the cleaning robot 22 to detect whether there is any obstacle in front of the cleaning robot 22. When the touch sensor detects an obstacle, the cleaning robot 22 first determines whether the obstacle is the charging station 21. If the obstacle is the charging station 21, the cleaning robot 22 stops moving and moves in another direction. If the obstacle is not the charging station 21, the cleaning robot 22 first leaves the original route to avoid the obstacle and returns to the original route after avoiding the obstacle.

In this embodiment, the charging station 21 comprises a wireless signal sensing device to sense the wireless signal output by the touch sensor of the cleaning robot 22. When a controller of the charging station 21 determines that the strength of the detected wireless signal is larger than a preset value, the charging station 21 changes the format of the IR light beam 25 to a second encoding format or a second modulation format. In other words, the charging station 21 can output at least two IR light beams with different encoding formats or modulation formats. Therefore, when the cleaning robot 22 determines that the format of the IR light beam is the second encoding format or the second modulation format, it means that the obstacle in front of the cleaning robot 22 is the charging station 21.

In another embodiment, the data carried by the IR light beam 25 comprises a second bit to indicate whether the cleaning robot 22 is near to the charging station. For example, if the value of the second bit is 0, it represents that the cleaning robot 22 is not near the charging station 21. If the value of the second bit is 1, it represents that the cleaning robot 22 is near the charging station 21. The cleaning robot 22 can continuously decode or demodulate the detected IR light beam to detect the logic level of the second bit to determine whether the cleaning robot 22 is near the charging station 21.

In another embodiment, when the cleaning robot 22 approaches to the charging station 21, the charging station 21 outputs a radio frequency (RF) signal, wireless signal or an infrared signal to let the cleaning robot 22 know that the cleaning robot 22 is close to the charging station 21. In another embodiment, Near Field Communication (NFC) devices are embedded in both the cleaning robot 22 and the charging station 21. When the NFC device of the cleaning robot 22 receives signals or data from the NFC device of the charging station 21, it means that the cleaning robot 22 is close to the charging station 22 and the cleaning robot 22 should stop accordingly. Generally speaking, the sensing distance of the NFC device is 20 cm.

FIG. 3a is a schematic diagram of an embodiment of an IR transmitter of a charging station according to the invention. The charging station 31 comprises an IR transmitter 32, wherein the IR transmitter 32 is offset for an angle θ when the IR transmitter 32 is assembled in the charging station 31. Thus, the first boundary b1 of the IR light beam output by the IR transmitter 32 is substantially perpendicular to the charging station 31. In this embodiment, the IR light beam output by the IR transmitter 32 has a scattering angle 2θ, thus, the IR transmitter 32 has to be offset for the angle θ and the first boundary b1 of the IR light beam is substantially perpendicular to the charging station 31 accordingly. Moreover, an included angle between the second boundary b2 and the charging station 31 is 2θ.

In FIG. 2, the first boundary b1 of the IR light beam is perpendicular to the charging station 21 and the charging station 21 guides the cleaning robot 22 to enter the charging station 21 along the first boundary b1. Similarly, the light generating device 12 in FIG. 1 can select one boundary of the light beam 15 to be perpendicular to the light generating device 12 and guides the cleaning robot to move to or move away from the light generating device 12.

FIG. 3b is a schematic diagram of another embodiment of an IR transmitter of a charging station according to the invention. The charging station 33 comprises an IR transmitter 34 and a parallel light guide plate 35. The parallel light guide plate 35 is disposed in the front of the IR transmitter 34. In this embodiment, the parallel light guide plate 35 covers only half the area of the IR transmitter 34. The parallel light guide plate 35 transforms the lights emitted by the IR transmitter 34 into parallel lights. Thus, the first boundary b1 is substantially perpendicular to the parallel light guide plate 35. Moreover, an included angle between the second boundary b2 and the charging station 31 is θ.

Figure 4:
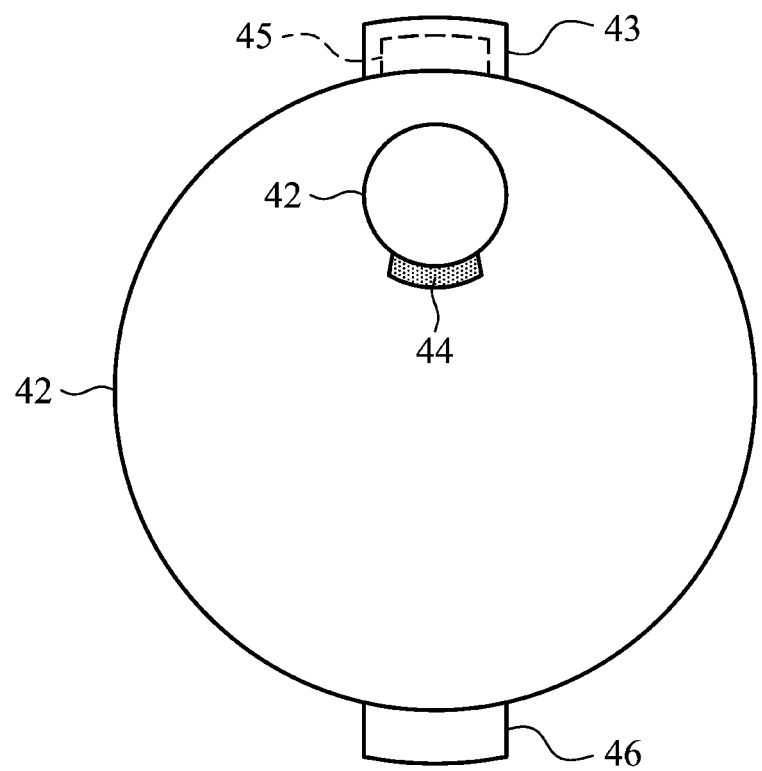
FIG. 4 is a schematic diagram of an embodiment of a cleaning robot according to an embodiment of the invention.

FIG. 4 is a schematic diagram of an embodiment of a cleaning robot according to an embodiment of the invention. The cleaning robot 41 comprises a non-omni directional light detector 42, a directional light detector 43, a mask 44, a wireless signal transmitter 45 and a charging port 46. In FIG. 4, the wireless signal transmitter 45 is integrated in the directional light detector 43 to output a wireless signal to the charging station. In FIG. 4, only the elements related to the invention are discussed, but the invention is not limited thereto. The cleaning robot 41 still may comprise other hardware devices, firmware or software for controlling the hardware, which are not discussed for brevity.

When the non-omni directional light detector 42 detects a light beam, a controller of the non-omni directional light detector 42 or a processor of the cleaning robot 41 first determines the strength of the detected light beam. If the strength of the received signal is less than a predetermined value, the controller or the processor does not respond thereto or take any action. When the strength of the received signal is larger than or equal to the predetermined value, the controller or the processor determines whether the light beam was output by a charging station.

If the light beam is output by the charging station, a controller of the cleaning robot 41 first determines whether the capacity of a battery of the cleaning robot 41 is less than a predetermined value. In other words, the controller first determines whether the cleaning robot 41 needs to be charged. If the cleaning robot 41 does not need to be charged, the cleaning robot 41 does not respond to the light beam and moves according to its original moving mode.

The light beam output by the charging station comprises a first boundary and a second boundary, wherein the first boundary is perpendicular to the charging station. When the cleaning robot 41 needs to be charged, the cleaning robot 41 moves to the charging station along the first boundary b1. The cleaning robot 41 first decodes or demodulates the light beam detected by the non-omni directional light detector 42 to know that the boundary detected by the non-omni directional light detector 42 is the first boundary or the second boundary.

Then, the non-omni directional light detector 42 is spun to determine the direction of the light beam or an included angle between the light beam and the current moving direction of the cleaning robot 41. When the direction of the light beam or the included angle is determined, the processor of the cleaning robot 41 determines a spin direction, such as a clockwise direction or counter clockwise direction. The cleaning robot 41 is spun in a circle at the same position. When the directional light detector 43 detects the light beam, the cleaning robot 41 stops spinning.

In another embodiment, when the non-omni directional light detector 42 detects the light beam and the light beam is output from the charging station, the non-omni directional light detector 42 and the cleaning robot 41 are spun in the clockwise direction or the counter clockwise direction simultaneously. When the directional light detector 43 detects the light beam, the cleaning robot 41 stops spinning.

In other words, the processor of the cleaning robot 41 controls the cleaning robot 41 to spin in the clockwise direction or the counter clockwise direction according to the detection result of the non-omni directional light detector 42. When the directional light detector 43 detects the light beam output by the charging station, the cleaning robot 41 stops spinning, and the processor of the cleaning robot 41 controls the cleaning robot 41 to move to the charging station straightforwardly.

The light beam output by the charging station comprises a first boundary and a second boundary, wherein the first boundary is perpendicular to the charging station. In this embodiment, the cleaning robot 41 moves along the first boundary to the charging station.

When a distance between the charging station and the cleaning robot 41 is less than a predetermined distance, the cleaning robot 41 spins for a predetermined angle, such as 180 degrees, and the cleaning robot moves backwards to enter the charging station. The charging port 46 then connects to the charging station to charge the cleaning robot 41.

Before approaching to the charging station, the cleaning robot 41 moves along the light beam output by the charging station and cleans the area near the light beam. The processor of the cleaning robot 41 continuously monitors the directional light detector 43 to determine whether the directional light detector 43 has received the light beam output by the charging station. When the directional light detector 43 fails to detect the light beam, the cleaning robot 41 is spun to calibrate the moving direction of the cleaning robot 41.

In one embodiment, the directional light detector 43 comprises a plurality of light detection units and the processor slightly calibrates the moving direction of the cleaning robot 41.

Figure 5:
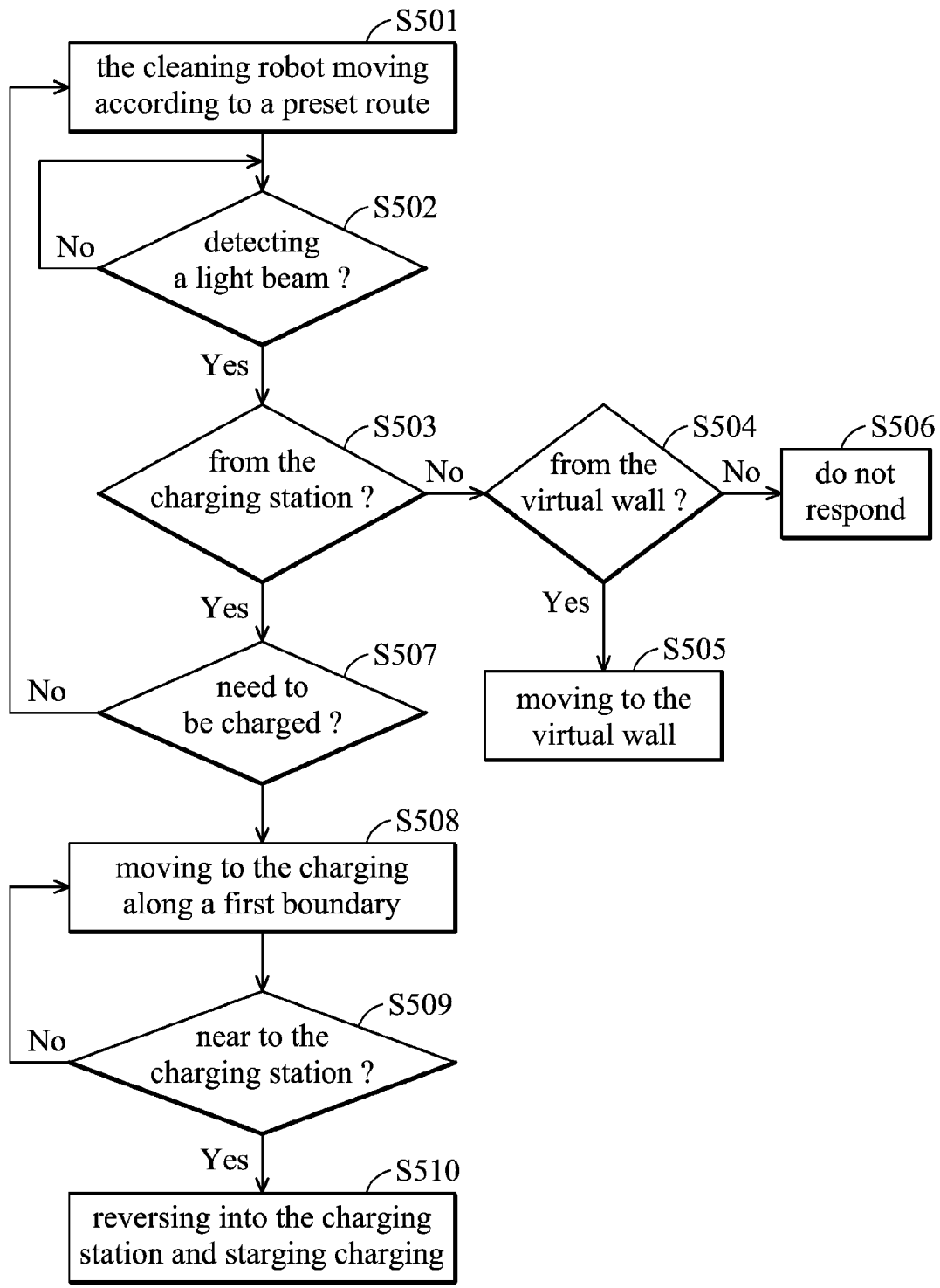
FIG. 5 is a flowchart of a charging method for a cleaning robot according to an embodiment of the invention.

FIG. 5 is a flowchart of a charging method for a cleaning robot according to an embodiment of the invention. In step S501, the cleaning robot to move according to a predetermined route. In step S502, a controller of the cleaning robot determines whether a light detector of the cleaning robot has detected a light beam and if so, the controller determines whether the strength of the light beam is larger than a predetermined value. If not, step S502 is still executed. If yes, step S503 is executed.

In step S503, the controller of the cleaning robot first determines whether the light beam is output by the charging station. If not, step S504 is executed. In step S504, the controller of the cleaning robot determines whether the light beam is output by the light generating device. If not, step S506 is executed and the controller of the cleaning robot does not respond thereto or take any action. If the light beam is output by the light generating device, step S505 is then executed. The cleaning robot then moves to or moves away from the light generating device along the light beam.

In step S507, the controller of the cleaning robot determines whether the cleaning robot needs to be charged. If the cleaning robot does not need to be charged, step S501 is executed and the cleaning robot moves according to the predetermined route. If the cleaning robot needs to be charged, step S508 is executed. The light beam output by the charging station comprises a first boundary and a second boundary, wherein the first boundary is perpendicular to the charging station. Thus, in step S508, the charging station guides the cleaning robot to move to the charging station along the first boundary.

In step S509, the charging station determines whether the cleaning robot is approaching to the charging station or a distance between the charging station and the cleaning robot is less than a predetermined distance. If yes, step S510 is executed. The cleaning robot spins in a circle for a predetermined angle, such as 180 degrees, and then the cleaning robot moves backwards to enter the charging station. If the cleaning robot does not approach to the charging station, step S508 is still executed.

Figure 6:
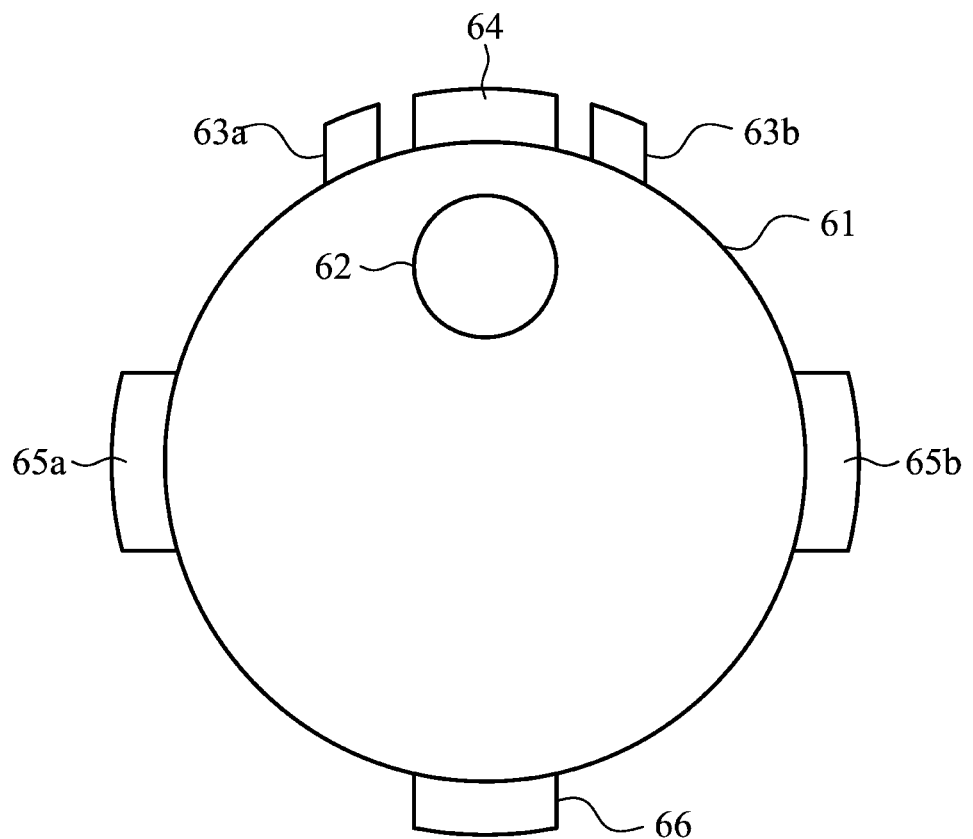
FIG. 6 is a schematic diagram of an embodiment of a cleaning robot according to the invention.

FIG. 6 is a schematic diagram of an embodiment of a cleaning robot according to the invention. The cleaning robot 61 comprises an omni-direction light detector 62, a first light detector 63a, a second light detector 63b, a first ultrasound detector 64, a second ultrasound detector 65a, a third ultrasound detector 65b and a charging port 66. The first light detector 63a and the second light detector 63b are disposed on both sides, as shown in FIG. 6, of the omni-direction light detector 62. The second ultrasound detector 65a and the third ultrasound detector 65b are disposed on both sides of the cleaning robot 61.

The first ultrasound detector 64 detects whether there is any obstacle, charging station or light generating device in front of the cleaning robot 61. The second ultrasound detector 65a and the third ultrasound detector 65b detect obstacles on both sides of the cleaning robot 61. The omni-direction light detector 62, the first light detector 63a and the second light detector 63b detect the light beam output by the light generating device or the charging station. A controller of the cleaning robot 61 determines the moving mode and the moving direction of the cleaning robot 61 according to the detection result of the omni-direction light detector 62, the first light detector 63a, the second light detector 63b, the first ultrasound detector 64, the second ultrasound detector 65a and the third ultrasound detector 65b.

The charging port 66 connects to the charging port of the charging station. When the charging port 66 connects to the charging port of the charging station, the controller of the cleaning robot 61 transmits an identification data or voltage information to the controller of the charging station via the charging port 66. The controller of the charging station determines the magnitude of the output voltage and the output current according to the voltage information or the identification data.

The light beam output by the charging station has a first boundary and a second boundary, wherein the first boundary is perpendicular or substantially perpendicular to a plane of the charging station. When the omni-direction light detector 62 detects the light beam output by the charging station, the controller of the cleaning robot 61 adjusts the moving direction of the cleaning robot to ensure that the first light detector 63a or the second light detector 63b aligns with the first boundary of the light beam from the charging station. Assuming the first light detector 63a aligns with the first boundary, and when the omni-direction light detector 62 or the second light detector 63b detects the light beam, then, the moving direction of the cleaning robot 61 needs to be adjusted. The controller of the cleaning robot 61 spins right to adjust the moving direction of the cleaning robot 61.

The first ultrasound detector 64 outputs an acoustic signal and detects the reflected acoustic signal or the acoustic signal output by the charging station. When the strength of the reflected signal is larger than a predetermined value, it represents that an obstacle is detected in front of the cleaning robot 61. The first ultrasound detector 64 transmits a detection signal to the controller of the cleaning robot 61. The cleaning robot 61 then determines whether the obstacle is the charging station according to the detection results of the omni-direction light detector 62, the first light detector 63a and the second light detector 63b. If the obstacle is the charging station, the cleaning robot 61 stops moving and spins for 180 degrees. Then, the cleaning robot 61 moves backwards to enter the charging station. In one embodiment, before entering the charging station, the controller of the cleaning robot 61 determines whether the moving direction of the cleaning robot 61 is right according to the detection result of the omni-direction light detector 62.

When the strength of the acoustic signal output by the charging station is larger than the predetermined value, it represents that the cleaning robot 61 is near to the charging station. The cleaning robot 61 stops moving and spins for 180 degrees. Then, the cleaning robot 61 moves backwards to enter the charging station.

In another embodiment, the charging station determines whether the cleaning robot 61 is approaching to the charging station or a distance between the charging station and the cleaning robot 61 is less than a predetermined distance. If the cleaning robot 61 is near to the charging station, the charging station outputs a light beam with a second encoding format, wherein the charging station outputs the light beam with a first encoding format before the cleaning robot 61 nears to the charging station. In other words, the controller of the cleaning robot 61 can determine whether the cleaning robot 61 is near to the charging station according to the encoding format of the detected light beam.

When the charging port 66 is connected to the charging port of the charging station, the controller of the cleaning robot 61 detects whether the voltage has been input via the charging port 66. If the controller of the cleaning robot 61 does not detects the voltage for a predetermine time of period, such as 6~10 seconds, the cleaning robot 61 moves forward for a first distance, such as 60~100 cm, then the cleaning robot 61 spins for a predetermined angle, such as 180 degrees, and the cleaning robot 61 re-executes a boarding procedure to charge the cleaning robot 61.

In another embodiment, if the charging port 66 cannot correctly connect to the charging station after the cleaning robot 61 enters the charging station, the charging station 61 moves forward for a second predetermined distance and then moves backwards to enter the charging station again. If the fail count for which the cleaning robot 61 does not correctly connect to the charging station is larger than a predetermined value, the cleaning robot 61 leaves the charging station.

Figure 7A:
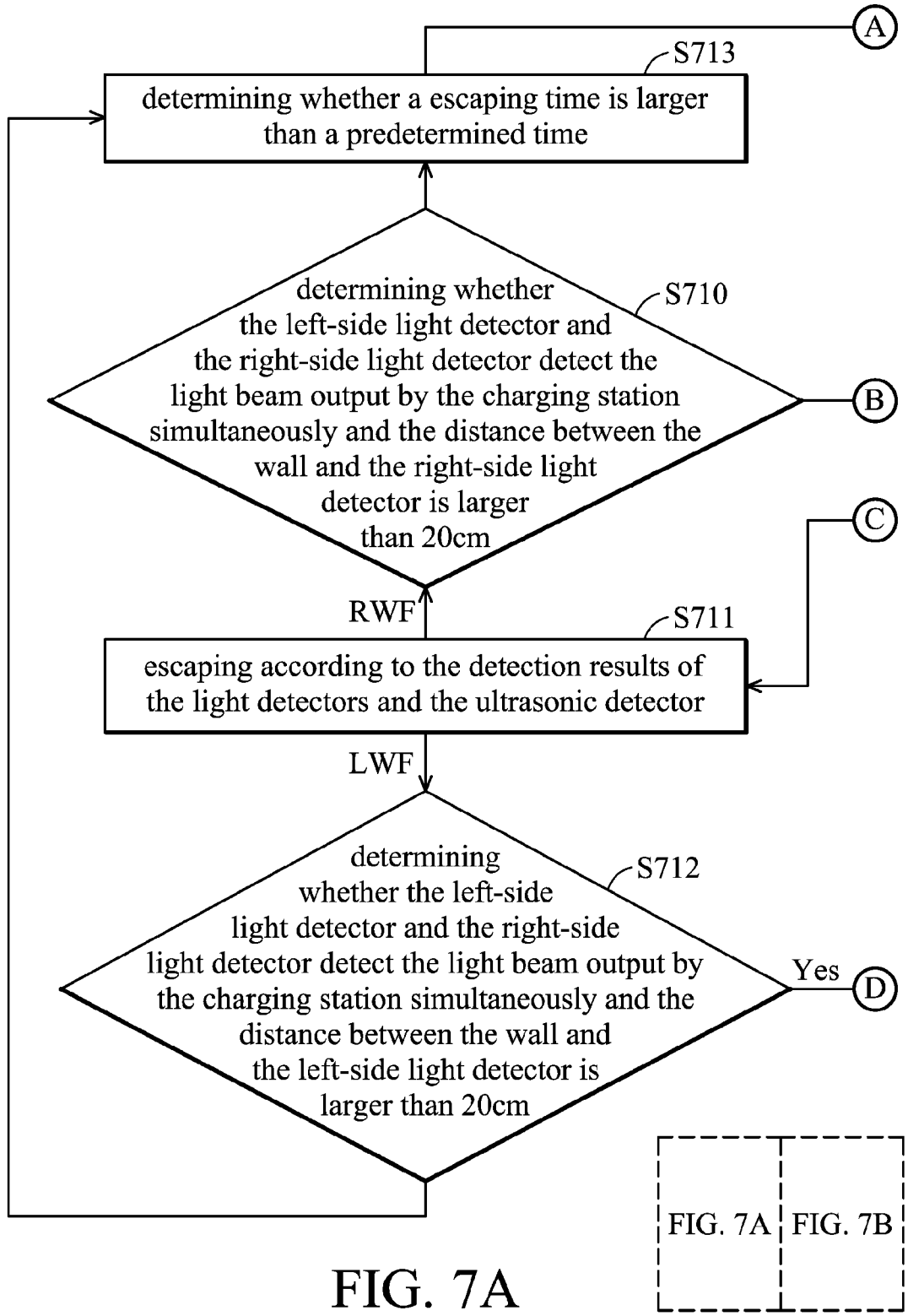
FIGS. 7A and 7B are a flowchart of a charging method for a cleaning robot according to another embodiment of the invention.
Figure 7B:
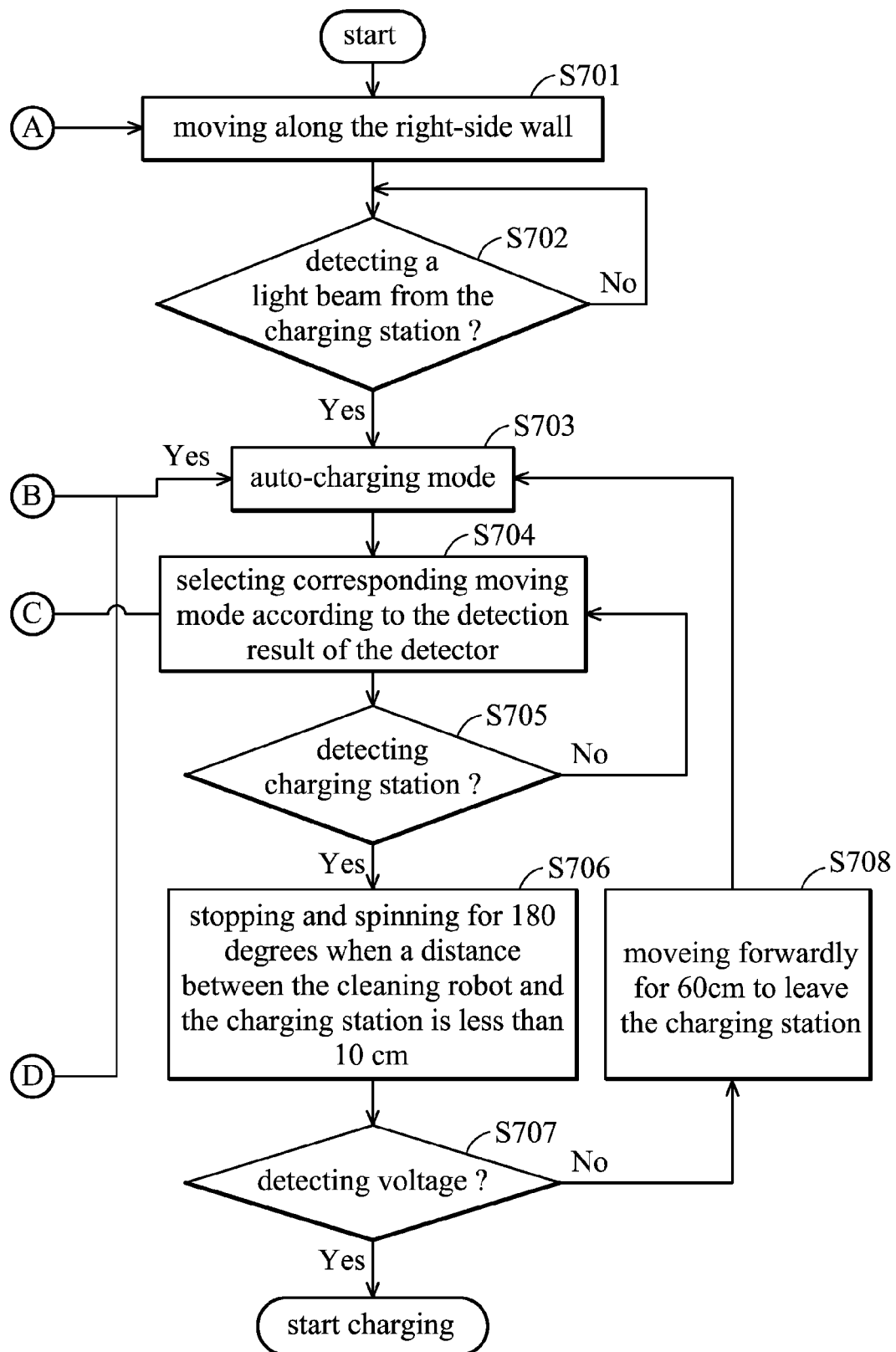

FIG. 7 is a flowchart of a charging method for a cleaning robot according to another embodiment of the invention. The default condition of the embodiment of FIG. 7 is that the cleaning robot needs to be charged and the cleaning robot moves to the charging station actively. Generally speaking, the charging station is placed near the wall, thus, in step S701, the cleaning robot moves along the wall that is at the right side of the cleaning robot. During the movement, the cleaning robot keeps a distance of about 20 cm from the wall. Although the embodiment is illustrated with the wall, the invention is not limited thereto. The cleaning robot can move along a boundary of a cleaning area. Note that for the cleaning robot of FIG. 7, reference may be made to the cleaning robot in FIG. 6.

In step S702, a controller of the cleaning robot determines whether an omni-direction light detector has detected the light beam output by the charging station. If not, the controller continuously monitors the omni-direction light detector to determine whether the omni-direction light detector has received the light beam output by the charging station. If yes, step S703 is executed. In step S703, the cleaning robot executes an auto-charge moving mode to move to the charging station. Then, step S704 is executed. step S704 is related to situations encountered by the cleaning robot during movement, the corresponding responses of the cleaning robot and the priority of the situations.

In this embodiment, if the cleaning robot detects that an obstacle exists in front of the cleaning robot, an obstacle-avoiding procedure is then executed to avoid the detected obstacle. If the controller of the cleaning robot determines that the cleaning robot is trapped by obstacles, the cleaning robot executes an escape procedure. In this embodiment, the light detector at the left-side of the cleaning robot, such as the first light detector 63a of FIG. 6, aligns with the light beam output by the charging station. When the omni-direction light detector, such as the omni-direction light detector 62 of FIG. 6, receives the light beam output by the charging station, the cleaning robot continues to move straightforwardly. When the light detector at the right-side of the cleaning robot, such as the second light detector 63b of FIG. 6, detects the light beam output by the charging station, the cleaning robot spins right until that the right-side light detector cannot detect the light beam output by the charging station. If the left-side light detector or the omni-direction light detector fails to detect the light beam output by the charging station for six times or within a predetermined time of period, the cleaning robot stops and is spun in a counter clockwise direction until the left-side light detector of the cleaning robot detects the light beam output by the charging station.

The controller of the cleaning robot can set the priorities of different conditions or situations. In this embodiment, the obstacle-avoiding procedure has the highest priority, the escaping procedure is second, and the calibration of the moving direction is the last.

In step S705, the controller determines whether the charging station has been detected according to the following conditions:

1. Determining whether there is an obstacle in front of the cleaning robot about 15 cm to 30 cm by an ultrasonic sensor;

2. Determining whether the omni-direction light detector has continuously detected the light beam output by the charging station for three times or the omni-direction light detector has continuously detected the light beam output by the charging station for a predetermined period of time;

3. The ultrasonic sensor detects an obstacle in front of the cleaning robot about 15 cm to 30 cm and the omni-direction light detector or the left-side light detector detects a signal from the charging station.

In step S706, the cleaning robot keeps moving and when a distance between the cleaning robot and the charging station is less than a predetermined distance, the cleaning robot stops. Then, the cleaning robot spins for a predetermined angle, such as 180 degrees, and the cleaning robot moves backwards to enter the charging station.

In step S707, the cleaning robot electrically connects to the charging port of the charging station. The controller of the cleaning robot detects whether the voltage has been input via the charging port. If the controller does not detect the voltage from the charging port for a predetermined time, such as 6 seconds to 10 seconds, the cleaning robot moves forward for a first predetermined distance, such as 60-100 cm, and then step S703 is executed. When the controller detects the voltage from the charging port, the charging station then charges the cleaning robot.

In another embodiment, if the cleaning robot does not electrically connect to the charging port of the charging station, the cleaning robot moves forward for a second predetermined distance, and then moves backwards to connect the charging station, wherein the second predetermined distance is less than or equal to the first predetermined distance. If the fail count for which the cleaning robot does not correctly connect to the charging station is larger than a predetermined value, then, the cleaning robot leaves the charging station.

In step S711, the controller of the cleaning robot determines whether the cleaning robot is to spin right or left according to the detection results of the left-side light detector and the right-side detector of the cleaning robot. In step S711, if the controller of the cleaning robot is determined to spin right to escape from being trapped, step S710 is executed. In step S710, the controller of the cleaning robot determines whether the left-side light detector and the right-side light detector detect the light beam output by the charging station simultaneously and the sensing distance of the right-side ultrasonic sensor is larger than 20 cm.

In step S711, if the controller of the cleaning robot determines to spin left to escape from being trapped, step S712 is executed. In step S712, the controller of the cleaning robot determines whether the left-side light detector and the right-side light detector have detected the light beam output by the charging station simultaneously and the sensing distance of the left-side ultrasonic sensor is larger than 20 cm.

In step S713, the controller of the cleaning robot determines that the escape time is larger than a predetermined time, thus, step S701 is executed. The cleaning robot moves to another position to re-execute step S701.

Figure 8:
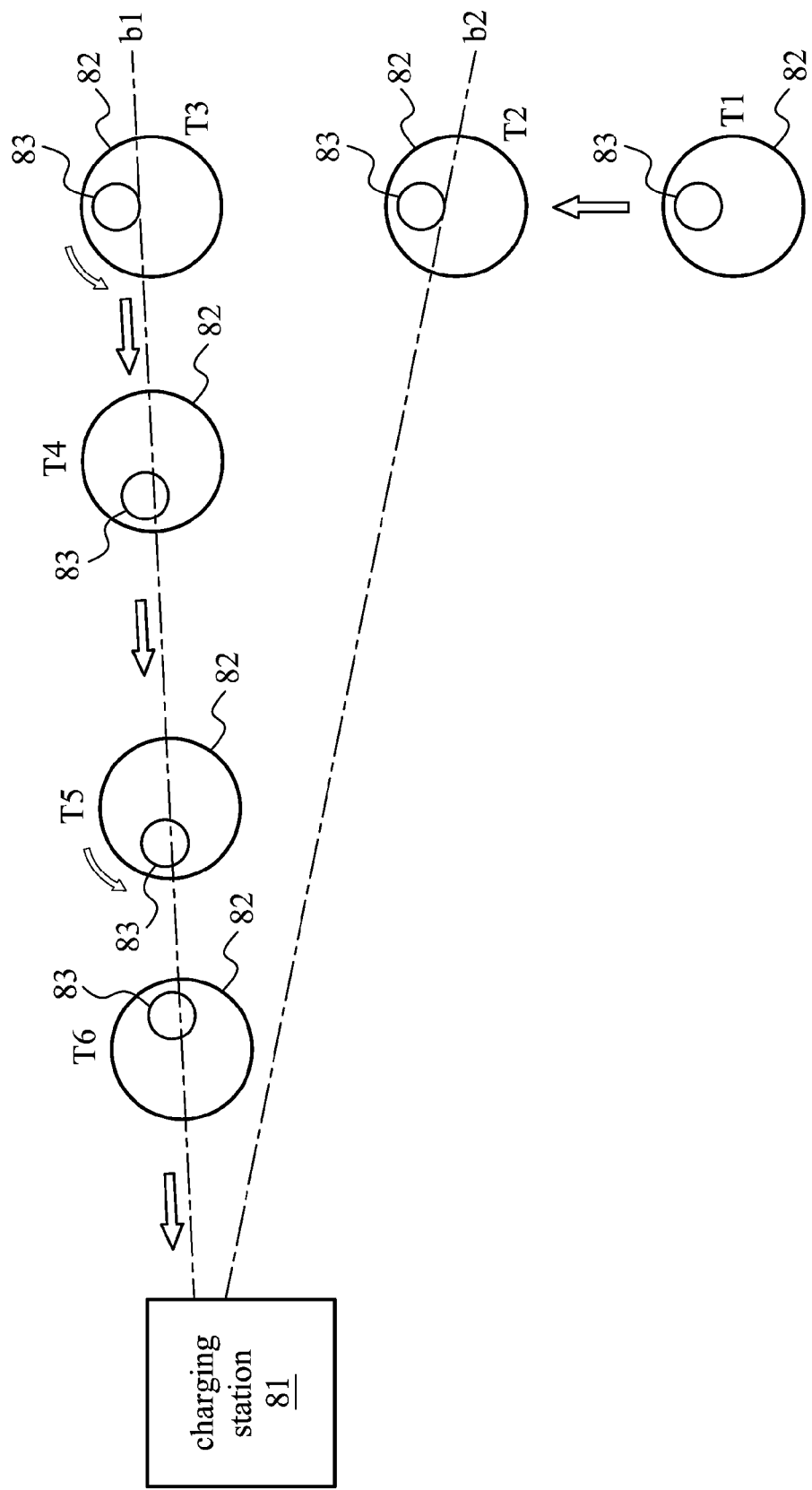
FIG. 8 is a schematic diagram of a charging method for a cleaning robot according to another embodiment of the invention.

FIG. 8 is a schematic diagram of a charging method for a cleaning robot according to another embodiment of the invention. The charging station 81 outputs a light beam having a first boundary b1 and a second boundary b2, wherein the first boundary b1 is substantially perpendicular to the charging station. At time T1, the cleaning robot 82 moves along a predetermined route. At time T2, the light detector 83 detects the light beam output by the charging station 81. A controller of the cleaning robot 82 decodes or demodulates the light beam detected by the light detector 83 to determine that the cleaning robot 82 has moved to the charging station 81 along the first boundary b1 or the second boundary b2.

In this embodiment, the cleaning robot 82 has to move to the charging station 91 along the first boundary b1 and the cleaning robot 82 therefore keeps moving forward. At time T3, the light detector 83 does not detect the light beam output by the charging station 81, thus, the cleaning robot 82 stops moving. The cleaning robot 82 is then spun in the counter clockwise direction until the light detector 83 detects the light beam output by the charging station 81 again. When the light detector 83 detects the light beam output by the charging station 81 again, the cleaning robot 82 is stopped from spinning.

At time T4, the cleaning robot 82 moves to the charging station 81 along the first boundary b1. At time T5, the cleaning robot 82 determines that the distance between the cleaning robot 82 and the charging station 81 is less than a predetermined distance d, thus, the cleaning robot 82 is stopped and spun for 180 degrees. At time T6, the cleaning robot 82 moves backwards to enter the charging station 81.

Figure 9:
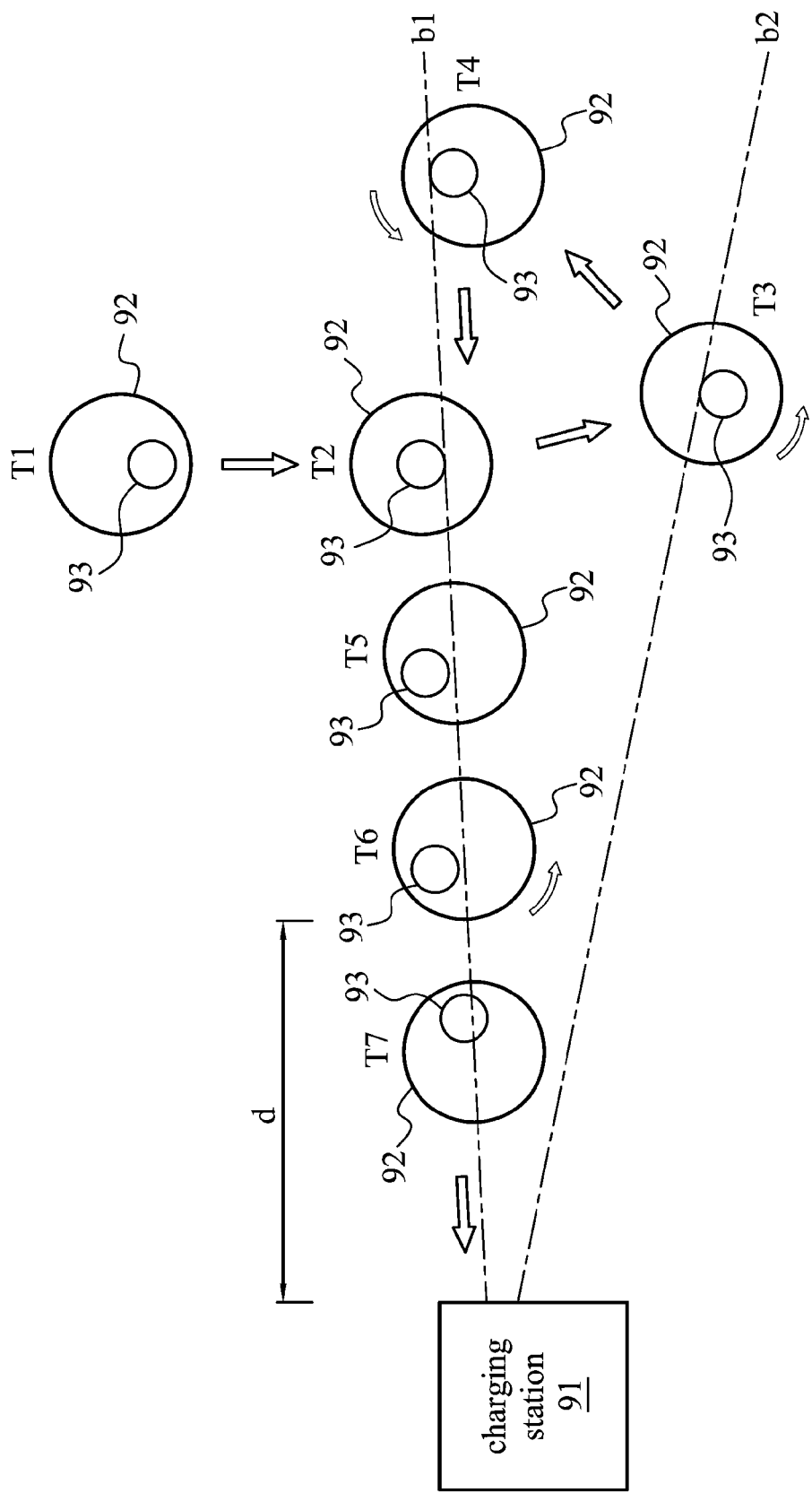
FIG. 9 is a schematic diagram of a charging method for a cleaning robot according to another embodiment of the invention.

FIG. 9 is a schematic diagram of a charging method for a cleaning robot according to another embodiment of the invention. The charging station 91 outputs a light beam having a first boundary b1 and a second boundary b2, wherein the first boundary b1 is substantially perpendicular to the charging station. At time T1, the cleaning robot 92 moves along a predetermined route. At time T2, the light detector 93 detects the light beam output by the charging station 91. A controller of the cleaning robot 92 decodes or demodulates the light beam detected by the light detector 93 to determine that the cleaning robot 92 has moved to the charging station 91 along the first boundary b1 or the second boundary b2.

In this embodiment, the cleaning robot 92 has to move to the charging station 91 along the first boundary b1, however, the cleaning robot 92 has already left the first boundary b1. Thus, the cleaning robot 92 has to return to the first boundary b1. At time T3, the light detector 93 does not detect the light beam output by the charging station 91, thus, the cleaning robot 92 is stopped from being moved. The cleaning robot 92 is then spun for a predetermined angle in the counter clockwise direction. When the cleaning robot 92 stops spinning, the cleaning robot 92 moves forwardly.

At time T4, the light detector 93 cannot detect the light beam output by the charging station 91, thus, the cleaning robot 92 therefore stops. Then, the cleaning robot 92 spins in the counter clockwise direction until the light detector 93 detects the light beam output by the charging station 91 again. When the light detector 93 detects the light beam output by the charging station 91 again, the cleaning robot 92 is stopped from spinning. At time T5, the cleaning robot 92 moves to the charging station 91 along the first boundary b1.

At time T6, the cleaning robot 92 determines that the distance between the cleaning robot 92 and the charging station 91 is less than a predetermined distance d, thus, the cleaning robot 92 stops and is spun for 180 degrees. At time T7, the cleaning robot 92 moves backwards to enter the charging station 91.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cleaning robot, comprising:
a light detector to detect a light beam; and
a controller coupled to the light detector, wherein when the controller determines that the light beam is being output by a charging station, the controller controls the cleaning robot to move to the charging station along a first boundary of the light beam, which is substantially perpendicular to the charging station, wherein the light detector comprises a rib, when the cleaning robot moves to the charging station along the first boundary of the light beam, the light beam is blocked by the rib such that the light detector does not detect the light beam during the movement of the cleaning robot, wherein the light detector is a non-omnidirectional light detector.

2. The cleaning robot as claimed in claim 1, wherein when a distance between the cleaning robot and the charging robot is less than a predetermined distance, the controller stops the cleaning robot and controls the cleaning robot to spin to a predetermined angle, and then the cleaning robot moves backwards to enter the charging station.

3. The cleaning robot as claimed in claim 1, wherein, the light beam is a first light beam, and when a distance between the cleaning robot and the charging robot is less than a predetermined distance, the charging station outputs a second light beam, and when the light detector detects the second light beam, the controller stops the cleaning robot and controls the cleaning robot to spin to a predetermined angle, and then the cleaning robot moves backwards to enter the charging station.

4. The cleaning robot as claimed in claim 1, further comprising:
a wireless signal detector to detect a wireless signal output by the charging station, wherein when a strength of the wireless signal is larger than a predetermined value, the controller stops the cleaning robot and controls the cleaning robot to spin to a predetermined angle, and then the cleaning robot moves backwards to enter the charging station.

5. The cleaning robot as claimed in claim 1, further comprising:
a first light detector disposed at a left side of the light detector; and
a second light detector disposed at a right side of the light detector, wherein the first light detector is aimed at the first boundary and when the second light detector detects the light beam, the controller controls the cleaning robot to spin right.

6. The cleaning robot as claimed in claim 1, wherein when the light detector detects a second light beam output by a light generating device, the controller controls the cleaning robot to move to the light generating device along the second light beam.

7. The cleaning robot as claimed in claim 1, wherein when the controller determines that the cleaning robot does not need to be charged, the controller controls the cleaning robot to move according to a predetermined direction.

8. The cleaning robot as claimed in claim 1, wherein when a fail count for which the cleaning robot does not correctly connect to the charging station is larger than a predetermined value or when a predetermined time for which the cleaning robot is connected to the charging station has been reached, the cleaning robot leaves the charging station.

9. The cleaning robot as claimed in claim 1, wherein when the cleaning robot electrically connects to the charging station and the controller does not detect the charging voltage after a predetermined amount of time, the cleaning robot moves forwards for a predetermined distance, and re-enters the charging station to eclectically connect to the charging station to charge the cleaning robot.

10. A charging system, comprising:
a charging station emitting a first light beam having a second boundary and a first boundary which is substantially perpendicular to the charging station; and
a cleaning robot, comprising:
a light detector; and
a controller coupled to the light detector to receive a detection result of the light detector, wherein when the light detector detects the first light beam, the controller controls the cleaning robot to move to the charging station along the first boundary, wherein the light detector comprises a rib, when the cleaning robot moves to the charging station along the first boundary of the light beam, the light beam is blocked by the rib such that the light detector does not detect the light beam during the movement of the cleaning robot, wherein the light detector is a non-omnidirectional light detector.

11. The charging system as claimed in claim 10, wherein when a distance between the cleaning robot and the charging robot is less than a predetermined distance, the controller stops the cleaning robot and controls the cleaning robot to spin to a predetermined angle, and then the cleaning robot moves backwards to enter the charging station.

12. The charging system as claimed in claim 10, wherein when a distance between the cleaning robot and the charging robot is less than a predetermined distance, the charging station outputs a second light beam, and when the light detector detects the second light beam, the controller stops the cleaning robot and controls the cleaning robot to spin to a predetermined angle, and then the cleaning robot moves backwards to enter the charging station.

13. The charging system as claimed in claim 10, wherein the cleaning robot further comprises a wireless signal detector to detect a wireless signal output by the charging station, and when a strength of the wireless signal is larger than a predetermined value, the controller stops the cleaning robot and controls the cleaning robot to spin to a predetermined angle, and then the cleaning robot moves backwards to enter the charging station.

14. The charging system as claimed in claim 10, wherein the cleaning robot further comprises:
 a first light detector disposed at a left side of the light detector; and
 a second light detector disposed at a right side of the light detector, wherein the first light detector is aimed at the first boundary and when the second light detector detects the light beam, the controller controls the cleaning robot to spin right.

15. The charging system as claimed in claim 10, wherein when the cleaning robot electrically connects to the charging station and the controller does not detect the charging voltage after a predetermined amount of time, the cleaning robot leaves the charging station.

* * * * *